INVENTORS
GIOVANNI ODONE
CLAUDE DEVENOGES
BY Emery L. Groff Jr.
ATTORNEY 3,488,557
LUMINOUS SIGNAL ELECTRONIC EXPOSURE METER FOR MOTION PICTURE CAMERAS Giovanni Odone and Claude Devenoges, Yverdon, Vaud, Switzerland, assignors to Paillard S.A., Vaud, Switzerland, a corporation of Switzerland
Filed May 24, 1965, Ser. No. 457,934
Claims priority, application Switzerland, July 8, 1964, 8,924/64
Int. Cl. H05b 37/02, 39/04, 41/36
U.S. Cl. 315—153                             7 Claims

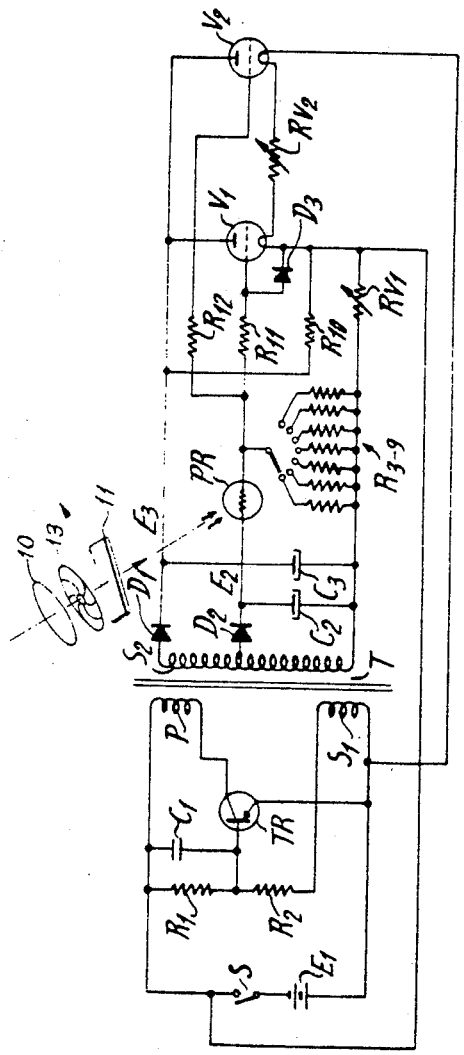
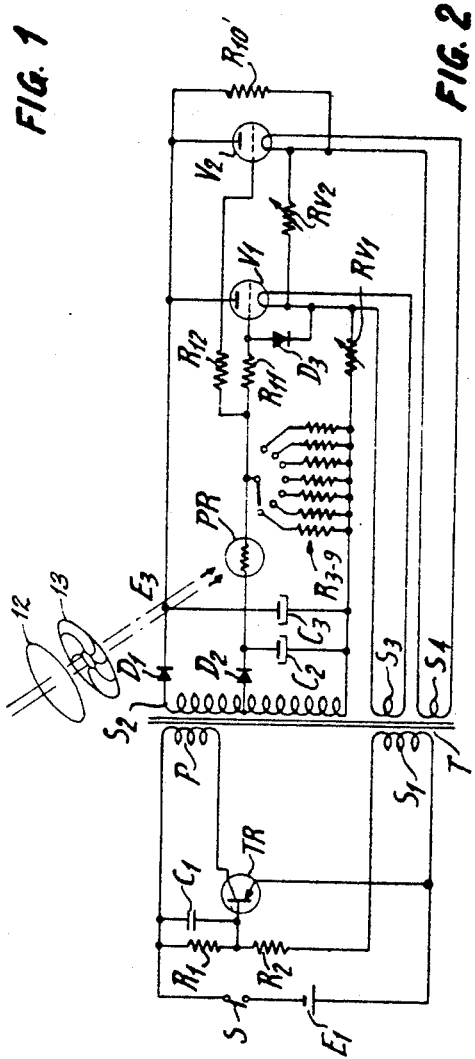

ABSTRACT OF THE DISCLOSURE

A motion-picture camera light exposure meter circuit for use as an independent exposure meter or for incorporation in the camera in which a photo-electric cell and a variable resistance means are connected in a circuit across an energy source, and are arranged to control the conductivity of a pair of electron tubes in an output circuit, which tubes are of a type which emit light when in the conductive state. In one embodiment the variable resistance means is selectively adjustable to modify the sensitivity of the circuit according to the film sensitivity, and the photo-electric element is subjected to a luminous flux, through an adjustable diaphragm, which is proportioned to the intensity of the light impinging on the film. The diaphragm is adjusted until the tubes are illuminated to the predetermined state indicating proper diaphragm adjustment for the movie camera. In another embodiment the photometer uses no adjustable diaphragm and the knob of the variable resistance is varied until the proper predetermined tube illumination is obtained. The knob position through a luminosity indicator provides selection of the proper diaphragm setting as a fraction of exposure time and vice versa for the camera.

---

Figure 3:
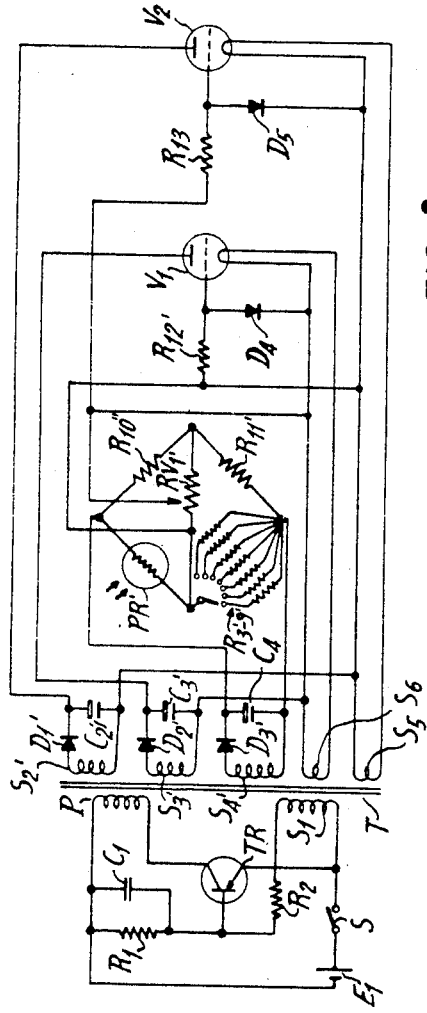

Various exposure meters are already known in the art and in particular the following one which includes a mirror inserted between the rear of the objective lens and the shutter so as to return the luminous beam passing out of the objective onto a photo-resistive element inserted in series with a supply of current and a galvanometer of the movable frame type the hand of which moves in front of a scale carrying a reference mark; an arrangement allows modifying the sensitivity and duration of illumination of the film. In a kinematographic camera, said duration of illumination depends on the rhythm of view-taking and on the opening given to the shutter. The operator, when acting on the diaphragm adjusts the amount of light reaching the film when the mirror has been moved out of the path of the luminous beam. Thus, it is necessary to bring the galvanometer hand into registry with the cooperating reference mark for ensuring a proper illumination of the film.

One of the main advantages of said arrangement consists in its mechanical strength and in the accuracy of the measurements made.

As a matter of fact, the available energy across the terminals of the photo-resistive cell serves only for shifting the hand of the galvanometer. Consequently, the value of the frictional torque exerted on the pivots is reduced with reference to the torque produced by the current passing through the galvanometer, which ensures a substantial indication accuracy and faithfulness of readings for the instrument over an extended period.

However, the galvanometer remains by far the most delicate part of the measuring system. With the constant increase in the sensitivity of films, the sensitivity of the galvanometer is now of a more and more exacting character and is of a magnitude of a few micro-amperes and this sensitivity can be obtained only by forming the galvanometer coil with a wire of a diameter of a magnitude of 10 mircons. Very special care must be exercised in the manufacture of the pivots and in the bearing in which the galvanometer frame is suspended if it is desired to obtain an instrument adapted to be fitted on an apparatus which is liable to be subjected to substantial fortuitous shocks. Such a galvanometer must also be of a reduced size, so that it may be fitted in such an apparatus and consequently its price is high.

The present invention has for its object to replace such a delicate and fragile galvanometer by indicating means showing whether the film is underexposed or overexposed.

The exposure meter according to the present invention, includes a photo-electric element subjected to a luminous flux proportional to the illumination of the subject to be exposed to a photographic or kinematographic camera, while indicating means show whether the adjustment obtained is lower or higher than the accurate value required and at least one member is adapted to modify the sensitivity of said indicating means so that it is possible to take into account at leats one of the parameters governing the degree of exposure of the film. Said photometer is characterized by the fact that it includes two indicating members adapted to emit light controlled by an electric circuit enclosing the above-mentioned parts, the arrangement being such that the relative luminosity of the two indicating members shows whether the film is underexposed, correctly exposed or overexposed.

Figure 4:
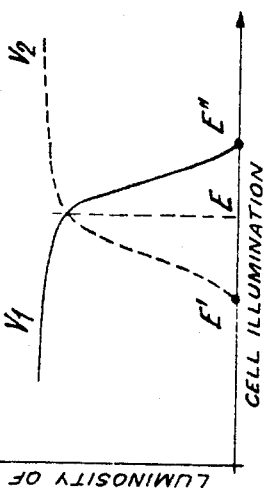

The accompanying drawings illustrate by way of example two embodiments of an exposure meter together with a modification thereof. In said drawings:

FIG. 1 is a wiring diagram of the first embodiment;
FIG. 2 is a wiring diagram of a modification of said first embodiment;
FIG. 3 is a wiring diagram of the second embodiment;
FIG. 4 illustrates the operation of said second embodiment.

The photometer illustrated in FIG. 1 includes a supply of voltage $E_1$ inserted in series with a switch S, said supply feeds on the one hand the heating means for two triodes $V_1$ and $V_2$ and, on the other hand, a voltage boosting circuit or transformer.

The characteristic properties of the triodes $V_1$ and $V_2$ are as follows: They have a high grid impedance and a low anode voltage adapted to vary within a large range between say 20 and 50 volts. Their heating is a direct heating and may be obtained through a battery of voltaic cells. Said triodes provide a luminous indication when they are conductive, while their bulk is reduced, their resistance against shocks is high and their life is long.

The voltage boosting circuit includes a transistor oscillator TR the emitter of which is grounded while its base is biased by two resistances $R_1$ and $R_2$.

The voltage supply $E_1$ is inserted in series with the emitter and collector of said transistor and with the primary P of a transformer T, while a condenser $C_1$ is inserted in parallel with the resistance $R_1$. The transformer includes a first secondary winding $S_1$ forming the feedback circuit for the primary oscillating circuit and a second secondary winding $S_2$ provided with a medial tapping.

The extreme terminals of the secondary $S_2$ are connected with a diode rectifier $D_1$ and with an electrolytic condenser $C_3$ inserted in series with the diode, the medial tapping of $S_2$ being similarly connected with one of the extreme terminals through a diode rectifier $D_2$ and a condenser $C_2$. Said arrangement generates, at the positive terminals of the condensers $C_2$ and $C_3$, D.C. voltages $E_2$ and $E_3$.

The voltage $E_2$ feeds a photo-resistive cell PR inserted in series with a variable resistance $R_{3-9}$ constituted by a plurality of resistances controlled by a switch. The voltage $E_3$ feeds the anodes of the two triodes $V_1$ and $V_2$, together with a voltage divider constituted by the resistances $R_{10}$ and $RV_1$.

The connection between the cell PR and the different resistances $R_{3-9}$ is also connected with the grid of the triode $V_1$ through the resistance $R_{11}$ and with the grid of the triode $V_2$ through the resistance $R_{12}$. The grid and cathode of the triode $V_1$ are connected through a diode $D_2$, while the two cathodes are connected with each other by a variable resistance $RV_2$.

The operation of such an arrangement is as follows:

For a predetermined amount of light impinging on the cell PR and corresponding to the ideal illumination of a given film, the triode $V_1$ should be ignited alone. The adjustment of said first conductivity threshold is obtained by varying the resistance of the resistance $RV_1$. The closing by one third of a subdivision of the diaphragm 13 to reduce the light impinging on cell PR extinguishes the triode $V_1$ whereas the opening by one third of a subdivision of the diaphragm 13 to increase the light impinging on cell PR ignites the triode $V_2$.

The adjustment of the conductivity threshold for the triode $V_2$ with reference to the triode $V_1$ is obtained through the resistance $RV_2$. The sensitivity of one third of a subdivision adjustment of the diaphragm to vary the illumination of the tubes may be reduced by adjusting the resistances $RV_1$ and $RV_2$, but these sensitivity adjustments are usually not changed after the device is manufactured.

Now if, for the same illumination, the sensitivity of the film is changed, it is necessary to adjust the variable resistances $R_{3-9}$ with a view to returning to the preceding results. As a consequence of the large impedance of the grid of the triode, the resistance of the cell may reach without any difficulty several megohms, which ensures a very large sensitivity for the circuit arrangement.

The diode $D_3$ functions to prevent the control grid of the triodes $V_1$ and $V_2$ from receiving a voltage which is too high, chiefly during the switching of the resistances $R_{3-9}$.

It should be remarked that the operation of the arrangement is not jeopardized by a substantial modification in the feed voltage. As a matter of fact, if the voltage provided by the voltaic cells varies, the voltage on the two grids and on the two cathodes also varies proportionally, but the difference in voltage between the grid and the cathode remains constant since said difference is very small and equal to two volts at the utmost, when the triode is conductive.

The modification illustrated in FIG. 2 differs from the arrangement illustrated in FIG. 1 solely through the fact that the supply of D.C. voltage $E_1$ is constituted by a single voltaic cell and that the cathode-heating means of tubes $V_1$ and $V_2$ are fed with A.C., the transformer including for this purpose two further secondaries $S_3$ and $S_4$, while the resistance $R_{10'}$ is connected between the point supplying the voltage $E_3$ and the cathode of the triode $V_2$.

The second embodiment illustrated in FIG. 3 includes a supply of D.C. current $E_1$ constituted by a single voltaic cell and a voltage converter including a transistor TR, two resistances $R_1$ and $R_2$ biasing the base of the latter and a transformer T including a primary P fed by the collector of said transistor, a feedback secondary $S_1$, two secondaries $S_{2'}$ and $S_{3'}$ inserted in series respectively with a diode $D_{1'}$ and a condenser $C_{2'}$ with a diode $D_2$ and a condenser $C_{3'}$ so as to supply the anode voltage respectively to the triode $V_2$ and to the triode $V_1$. A secondary $S_{4'}$ is inserted in series with a diode $D_{3'}$ and a condenser $C_4$ so as to feed a measuring bridge, and two further secondaries $S_5$ and $S_6$ feed the heating means for the triodes $V_2$ and $V_1$ with A.C.

The four arms of the measuring bridge include respectively a photo-resistive cell PR', and adjustable resistance comprising a plurality of resistances $R_{3'-9'}$, a resistance $R_{10''}$ and a resistance $R_{11''}$. The voltage indicating the lack of balance in the bridge is tapped off a voltage divider constituted by a variable resistance $RV_{1'}$. Said voltage is applied in opposite directions between the grid and the cathode of the two triodes $V_1$ and $V_2$ through the agency of the resistances $R_{12'}$ and $R_{13}$ inserted in the grid circuits of the triodes. The diodes $D_4$ and $D_5$ function to prevent the grids from receiving a positive bias current which is too high.

The operation of the arrangement is as follows:

When the bridge is balanced, the two triodes are conductive and provide the same luminosity. As soon as the bridge is no longer balanced, a positive voltage is applied to the grid of one of the triodes while a negative voltage is applied to the grid of the other triode. Consequently, the latter will be less conductive and less luminous, while the first-mentioned triode remains constantly under the same conductive conditions, since the positive voltage applied to its grid is limited by the corresponding diode, $D_4$ or $D_5$ according to the case. Of course, as soon as the bridge is sufficiently unbalanced, one of the triodes is completely extinguished, while the other remains normally conductive.

The behavior of the two triodes is illustrated in the graph of FIG. 4 the graph in which the abscissa defines the illumination of the cell PR', while the ordinates define the luminosity of the two triodes $V_1$ and $V_2$. The point E corresponds to the ideal illumination of the film for which the two triodes have the same luminosity. When the illumination is increased, for instance by one third, the triode $V_1$ is completely extinguished as shown at E, while the luminosity of the triode $V_2$ remains substantially constant, and conversely when the illumination is reduced by one third as shown at E'.

In the three embodiments illustrated, it has been assumed that the photo-resistant cell PR, when the circuit is incorporated in a camera, receives a fraction of the totality of the luminous rays passing through the objective lens 10 of the camera, as indicated by the light reducer 11, or the like, in FIG. 1. It is however obvious that the luminous rays passing out of the subject to be reproduced on a photographic or kinematographic film may be directed onto the cell through optic means 12 independent of the objective lens of the camera, as indicated in FIG. 2, said arrangement being provided if required with an adjustable diaphragm 13 for the adjustment of the amount of light passing through it. The user varies the adjustment of the diaphragm until the photometer indicates that the proper adjustment is obtained, by lighting tube $V_1$ in the circuits of FIGS. 1 and 2, or by simultaneously lighting tubes $V_1$ and $V_2$ in the circuit of FIG. 3. The same diaphragm setting is then made on the motion-picture camera.

When the photometer is used independent of any camera or photographic device, and without a diaphragm, all the adjustment values of the camera may be given out by the values of resistances in the circuit. With the photo-conductor PR exposed to the light of the scene to be filmed, the selection knob for adjustable resistances $R_{3-9}$ is turned until the selection of resistance is obtained which illuminates the tubes of the photometer circuit in the proper manner. The position of the knob is then representative of the light intensity striking the photo-conductor. The knob can be coupled to a well known indicator of luminosity which permits deducing the exposure time as a function of a chosen diaphragm setting or vice persa, the diaphragm setting to be used as a function of an arbitrarily selected exposure time.

We claim:
1. A compact portable electronic exposure meter adapted to measure the light impinging on a film in a camera and render a luminous signal corresponding there- to, comprising a source of low voltage D.C. as the only voltage supply source for all elements of the exposure meter, means connected with said source of low voltage D.C. forming a supply of higher pulsating D.C. voltage than the first mentioned voltage, a photoelectric element subjected to a light the intensity of which depends on the intensity of said light impinging on the film, two luminous signal indicating elements adapted to illuminate in the conductive state, circuit means operatively connecting said supply of higher pulsating D.C. voltage with said indicating elements and with the photoelectric element and including adjustable means whereby the relative luminosity of said elements depends on the relative value of the actual exposure with reference to the accurate exposure, means for adjusting the sensitivity of said indicating elements, one of said two luminous indicating elements controlled by said circuit means to illuminate when the light impinging on the photoelectric element corresponds to an under-exposure range for the film, and the other of said luminous indicating elements being controlled by said circuit means to illuminate when the light impinging on the photoelectric element corresponds to an over-exposure range for the film.

2. An electronic exposure meter as set forth in claim 1 in which the under-exposure and over-exposure ranges of the respective two luminous indicating elements overlap to provide an accurate exposure range, whereby said circuit means is operative to illuminate said two luminous indicating elements when the light impinging on the photoelectric element corresponds to an accurate exposure range for the film.

3. A compact portable electronic exposure meter adapted to measure the light impinging on a film in a camera and render a luminous signal corresponding thereto, comprising a source of low voltage D.C. as the only voltage supply source for all elements of the exposure meter, means connected with said source of low voltage D.C. forming a supply of higher pulsating D.C. voltage than the first mentioned voltage, a photoelectric element subjected to a light the intensity of which depends on the intensity of said light impinging on the film, two luminous signal indicating elements adapted to illuminate in the conductive state, circuit means operatively connecting said supply of higher pulsating D.C. voltage with said indicating elements and with the photoelectric element and including adjustable means whereby the relative luminosity of said elements depends on the relative value of the actual exposure with reference to the accurate exposure, means for adjusting the sensitivity of said indicating elements, one of said two luminous indicating elements controlled by said circuit means to illuminate when the light impinging on the photoelectric element corresponds to an accurate exposure of the film, the other of the luminous indicating elements controlled by said circuit means to illuminate when the light impinging on the photoelectric element is on one side of that corresponding to an accurate exposure of the film, and both of said two luminous indicating elements are held in the extinguished state by said circuit means when the light impinging on the photoelectric element is on the opposite side of that corresponding to an accurate exposure of the film.

4. An electronic exposure meter as set forth in claim 3 in which said other luminous indicating element is extinguished when said one of said two luminous indicating elements is illuminated and vice versa.

5. An electronic exposure meter adapted to measure the light impinging on a film in a camera, comprising a supply of low voltage D.C., a transistorized oscillating circuit fed by said supply, a boosting transformer fed by said oscillating circuit, at least one rectifier fed by said transformer and forming a supply of D.C. at a higher voltage than the first mentioned voltage, a photoelectric element subjected to a light the intensity of which depends on the intensity of said light impinging on the film, two luminous indicating elements adapted to illuminate in the conductive state, circuit means operatively connecting said rectifier with said elements and with the photoelectric element and including adjustable means whereby the relative luminosity of said elements depends on the relative value of the actual exposure with reference to the accurate exposure and means for adjusting the sensitivity of said indicating elements.

6. An electronic exposure meter adapted to measure the light impinging on a film and render a luminous signal corresponding thereto comprising a photo-resistive cell, a supply of voltage, an adjustable resistance having two terminals inserted in series between said supply and said cell and the value of which is adjustable in accordance with the sensitivity of the film and the duration of illumination, two luminous indicating triodes adapted to illuminate in the conductive state having control grids connected with one terminal of the resistance and having cathodes connected with the other terminal thereof, independently adjustable resistances inserted between said cathodes and said other terminal respectively and adapted to bias the cathodes and thereby adjust the threshold of conductivity of the corresponding triode, said adjustable resistances adjusted to ensure extinction of both triodes whenever the light impinging on the photo-resistant cell is on one side of that corresponding to an accurate exposure of the film, illumination of one triode only whenever said light is equal to that corresponding to accurate exposure and illumination of both triodes when said light is on the other side of that corresponding to accurate exposure.

7. An electronic exposure meter adapted to measure the light impinging on a film and render a luminous signal corresponding thereto comprising a photo-resistive cell, a supply of voltage, an adjustable resistance inserted in series between said supply and said cell and the value of which is adjustable in accordance with the sensitivity of the film and the duration of illumination, two luminous indicating triodes adapted to illuminate when conductive, a pair of resistance elements, an electric bridge including two sides one of which is constituted by two arms in series in which are inserted respectively said cell and said adjustable resistance and the other is constituted by said two resistance elements in series, a voltage divider connecting the points separating the arms in the two sides of the bridge, and circuit means feeding in opposite directions the cathode grid spaces in the two triodes with potentials tapped off said voltage divider, the balance of the bridge for accurate illumination of the film producing equal illumination of the two triodes and the lack of equilibrium in the bridge producing a greater illumination of one triode for a difference in the light illuminating the film with reference to the accurate illumination, the triode which has a greater illumination depending on the direction of said difference.

References Cited

UNITED STATES PATENTS

| | | | |
|---|---|---|---|
| 2,808,559 | 10/1957 | Engle | 250—205 X |
| 3,128,384 | 4/1964 | Nelson et al. | 250—205 |
| 2,095,124 | 10/1937 | Cockrell | 315—153 X |
| 2,199,394 | 5/1940 | Dewan | 250—206 X |

JAMES W. LAWRENCE, Primary Examiner

C. R. CAMPBELL, Assistant Examiner

U.S. Cl. X.R.

250—201, 205, 210, 214; 315—135; 356—227